United States Patent
Narayanan et al.

(10) Patent No.: US 10,003,649 B2
(45) Date of Patent: Jun. 19, 2018

(54) SYSTEMS AND METHODS TO IMPROVE READ/WRITE PERFORMANCE IN OBJECT STORAGE APPLICATIONS

(71) Applicant: DELL PRODUCTS L.P., Round Rock, TX (US)

(72) Inventors: Rajesh Narayanan, San Jose, CA (US); Ke Xu, Vacaville, CA (US)

(73) Assignee: Dell Products LP, Round Rock, TX (US)

(*) Notice: Subject to any disclaimer, the term of this patent is extended or adjusted under 35 U.S.C. 154(b) by 436 days.

(21) Appl. No.: 14/706,803

(22) Filed: May 7, 2015

(65) Prior Publication Data
US 2016/0330281 A1 Nov. 10, 2016

(51) Int. Cl.
*G06F 15/16* (2006.01)
*H04L 29/08* (2006.01)
*H04L 29/06* (2006.01)

(52) U.S. Cl.
CPC ...... *H04L 67/1097* (2013.01); *H04L 67/1095* (2013.01); *H04L 67/322* (2013.01); *H04L 63/101* (2013.01)

(58) Field of Classification Search
CPC ............. H04L 67/1097; H04L 67/1095; H04L 67/322; H04L 63/101
See application file for complete search history.

(56) References Cited

U.S. PATENT DOCUMENTS

| | | | | |
|---|---|---|---|---|
| 2013/0151663 A1* | 6/2013 | He | ...................... | H04L 67/1097 709/217 |
| 2015/0326426 A1* | 11/2015 | Luo | ........................ | H04L 49/25 370/218 |
| 2017/0111450 A1* | 4/2017 | Zhou | ................... | H04L 67/1097 |

OTHER PUBLICATIONS

Weil, Sage A. et al., "RADOS: A Scalable, Reliable Storage Service for Petabyte-scale Storage Clusters," 10pgs.
Weil, Sage A. et al., "CRUSH: Controlled, Scalable, Decentralized Placement of Replicated Data," SC2006, Nov. 2006, Tampa, Florida, 0-7695-2700-0/06, IEEE, 12pgs.
Printed from the internet. URL:http://ceph.com, 2015, 1pg.

* cited by examiner

*Primary Examiner* — Viet D Vu
(74) *Attorney, Agent, or Firm* — North Weber & Baugh LLP

(57) ABSTRACT

Various embodiments of the invention optimize and improve object storage performance in large-scale distributed networks. In certain embodiments, this is accomplished by taking advantage of the algorithm that determines a map that contains information about storage locations of object replica. This information directly translates to flow-information in real-time and is used by an SDN controller to generate dynamic flow information for traffic within the network. The SDN controller may apply QoS policies and assign QoS priorities to preferred traffic.

20 Claims, 7 Drawing Sheets

150

```
obj_hash = hash(object_name)
pg = obj_hash % num_pg
osds_for_pg = crush(pg)
primary = osds_for_pg[0]
replicas = osds_for_pg[1:]
```

500

```
CIP = ClientIP;
POSD=PrimaryOSD;
SOSD=SecondaryOSD;
TOSD=Tertiary OSD

Flow Map could look like the following:
Flow1: <CIP, CIP-port, POSD-IP, POSD-port, etc>
Flow2: <POSD-IP, POST-port, SOSD-IP, SOSD-port, etc>
Flow3: <POSD-IP, POST-port, TOSD-IP, TOSD-port, etc>
...
FlowN: <POSD-IP, POST-port, TOSD-IP, TOSD-port, etc>
```

550

US 10,003,649 B2

SYSTEMS AND METHODS TO IMPROVE READ/WRITE PERFORMANCE IN OBJECT STORAGE APPLICATIONS

BACKGROUND

A. Technical Field

The present invention relates to storage networks and, more particularly, to systems, devices, and methods of reducing latency by integrating Software-Defined Networking (SDN) with an object storage client in a cluster to enable acceleration of Software Defined Storage (SDS).

B. Background of the Invention

In today's large-scale storage networks, identification of storage flows early in the life-cycle of a 'write' is critical in making the network storage application-aware in order to optimize network performance. Unfortunately, most network applications are neither SDN-aware, nor are SDN networks application-aware, unless there is an explicit exchange of application information between the network application and the SDN network. In particular, in Object Storage applications, such as Ceph, when multiple object replica are present, the replica location with the highest latency dominates read/write speeds due to relatively late identification of object storage flows. What is needed are systems and methods that provide timely identification of flows in a storage network and improve Object Storage performance.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

Figures 1A, 1B:
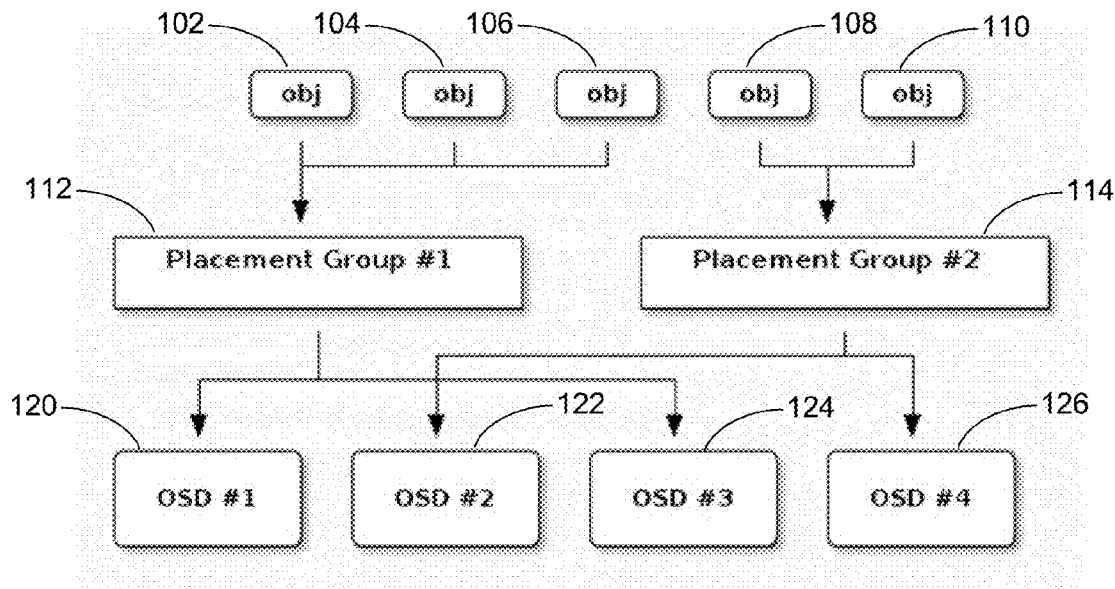
FIG. 1A shows a prior art mapping procedure to store objects in a Ceph cluster.
FIG. 1B is examplary pseudocode for mapping procedure for storing objects in a Ceph cluster.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

In this document, although mainly a Ceph implementation of an object storage client is discussed for exemplary purposes, it is noted that the present invention is not limited to Ceph implementations, and that embodiments of the present invention are equally applicable to other object storage clients known in the art.

FIG. 1A shows a prior art mapping procedure to store objects in a Ceph cluster. Ceph is an open-source software defined storage (SDS) platform that provides a scalable Ceph Storage Cluster. A typical Ceph Storage Cluster consists of two types of Daemons: a Ceph Monitor and Ceph Object Storage Device (OSD) Daemon. Generally, a Ceph Metadata Server (MDS) is necessary only when running Ceph Filesystem clients. At a minimum, a Ceph cluster requires one Ceph Monitor and two Ceph OSD Daemons. A Ceph OSD Daemon stores data, handles data replication, recovery, backfilling, rebalancing, and provides some monitoring information to Ceph monitors by checking other Ceph OSD Daemons for a heartbeat. A Ceph Monitor maintains maps of the cluster state, including the Monitor map, the OSD map, the Placement Group (PG) map, and a CRUSH map. Ceph maintains a history of each state change in the Ceph Monitors, Ceph OSD Daemons, and PGs. A Ceph MDS stores metadata on behalf of the Ceph FS and allows Portable Operating System Interface file system users to execute basic commands without placing scale, rebalance, and recover dynamically. A librados Application Programming Interfce (API) enables interacting with the OSDs and Monitors in the Ceph Storage Cluster. librados supports C/C++, Java, Python, Ruby, and PHP. Built on librados, Ceph also provides a number of service interfaces, including Block Device, Object Storage, Ceph FS, and corresponding APIs—librbd, librgw, libcephfs, respectively.

To store data in a Ceph cluster, a Ceph storage system supports the notion of 'pools,' which are logical partitions for storing objects. Each pool has a number of PGs, which represent a grouping of objects. The number of PGs that a pool contains, and the number of object replica could be specified when creating a pool or modified after creation. Object is the smallest unit of data storage in a Ceph cluster, and everything is stored in the form of objects. Storing objects in a Ceph cluster is a two-step mapping procedure.

When placing data in the cluster, first, objects 102-110 are mapped into PGs 112-114, then PGs 112-114 are mapped onto OSDs 120-126, which are data structures used in Ceph. Many objects 102-106 map to a single PG 112, e.g., using a CRUSH algorithm, but each object 102-110 maps to exactly one PG 112-114. A PG 112-114, in turn, maps to a number of OSDs 120-126 on a list of OSDs 120-126, wherein the first PG on the list is denoted as the primary OSD and the remaining OSDs are replica. Note that more than one PG may map into the same OSD. In example in FIG. 1A, each of two PGs 112, 114 maps into 2 OSDs 120 and 124—primary OSD 120 and non-primary OSD 124. Both PGs 112, 114 are distributed in the same network 100. Note that it would be possible both PGs to have 4 OSDs and assign their own primary and non-primary OSDs differently from each other, e.g., based on relative distance in network 100. FIG. 1B is exemplary pseudocode 150 for mapping procedure for storing objects in a Ceph cluster.

Figure 2:
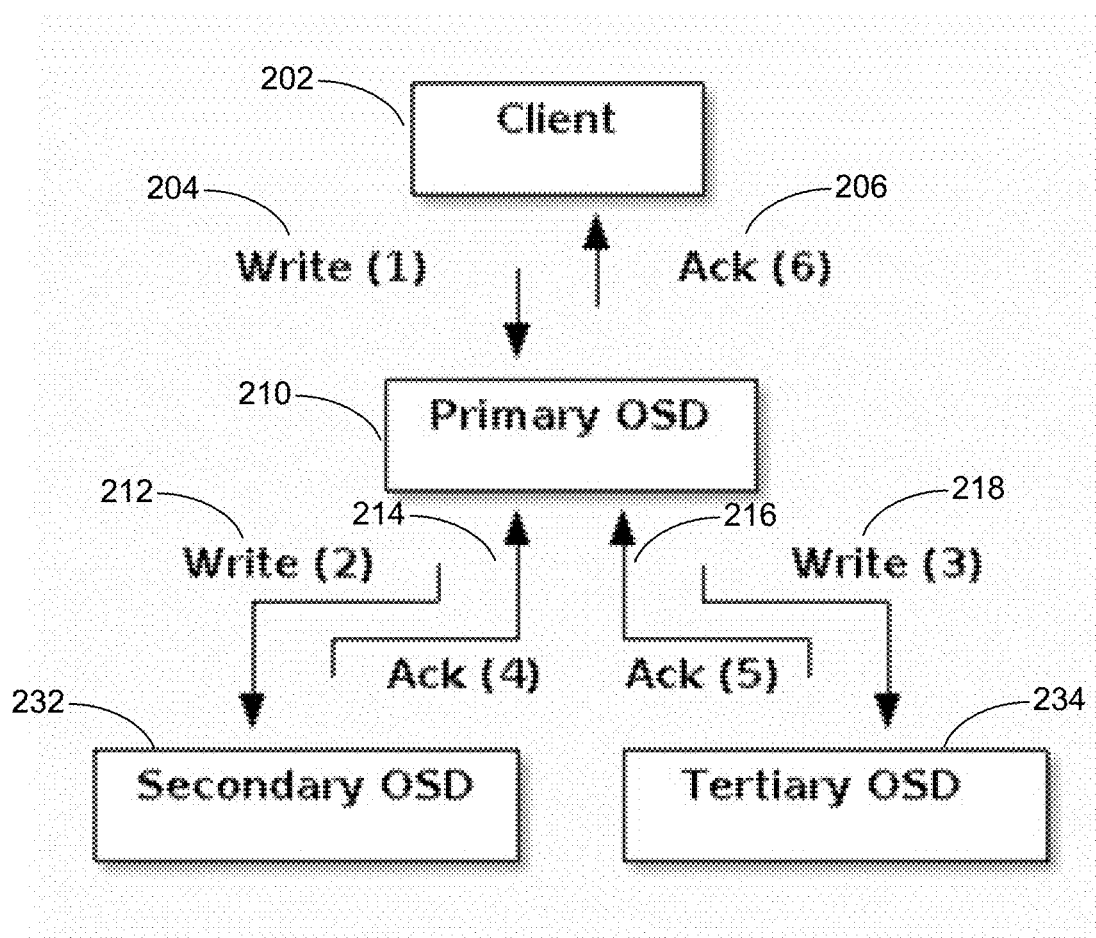
FIG. 2 is a general illustration of a replication procedure based on Ceph.

A replication procedure based on the storage framework Ceph is demonstrated in FIG. 2. Like Ceph clients, Ceph OSD Daemons use the CRUSH algorithm, but the Ceph OSD Daemon uses it to compute where replica of objects should be stored as well as for rebalancing purposes. In a typical write scenario, Ceph client 202 uses the CRUSH algorithm to determine where to store an object, maps the object to a pool and placement group, then looks at the CRUSH map to identify the primary OSD for the placement group.

Client 202 in FIG. 2 writes 204 the object to the identified placement group in primary OSD 210. Then, primary OSD 210 with its own copy of the CRUSH map identifies and writes 212 into secondary 232 and tertiary OSDs 234 to replicate itself according to notions of redundancy in object storage applications. Primary OSD 210 replicates the object to the appropriate placement groups in secondary 232 and tertiary OSDs 234 depending on the number of replica or copies.

Once all objects and all copies have been written 204, 212, 218 and all acknowledgements 206, 214, 216, which indicate that the object was stored successfully, have been received by secondary 232 and tertiary OSDs 234, primary OSD 210 responds to Ceph client 202 with acknowledge signal 206.

In short, as soon as the objects are determined with CRUSH and the application causes Ceph client 202 to use CRUSH to determine the PGs the CRUSH algorithm determines what the map that includes primary 210, secondary 232, etc. OSDs looks like, the application starts the writing procedure. However, neither the application nor Ceph client 202 control the network; they merely provide information to the network to enable replication procedure 200.

As will be discussed with respect to FIG. 4-7, various embodiments of the present invention take advantage of knowing the map and the assignment of primary and non-primary OSD. Since, in object storage implementations that use object storage clients (e.g., Ceph) the map (i.e., the network flow) is known beforehand for a specific object to be written (e.g., which placement group CRUSH will determine for replica), a determination can be made as to which placement group any given object will be written into. Thus, this information may be used to determine how traffic will ultimately flow independent of what the network looks like. In addition, source and destination addresses are also known prior to a write taking place, because these addresses are based on ports that are pre-determined, here, by Ceph. As a result, this self-identification of the flow can be communicated to an OSD controller that manages the network (e.g., flow entries, NW routes, QoS policies, etc.) in order to generate dynamic flow information on how traffic will flow in the network to ensure that a particular object will be written into a predetermined placement group of OSDs even before traffic commences, such that the flow can be written into the network at a predetermined moment in time. For example, since traffic will be associated with source and destination IPs, a network controller (e.g., SDN controller) can be used to ensure that that traffic receives the appropriate QoS. As will be explained in greater detail further below, the network controller can then assign the priorities and program the network according to a desired path.

One major problem with Ceph specific applications, in particular, is latency caused when writing a large number of replica and/or writing across multiple clusters, for example, in large-scale distributed datacenters. Within a small cloud cluster, such as in a rack or less than ten racks at one location, writing data using Ceph typically causes only moderate latency because OSDs are physically close to each other and bandwidth for transferring data in local networks is typically sufficient. In contrast, in large-scale distributed datacenters with, e.g., one million servers at differing locations, writing data using Ceph is likely to cause significant latency, as will be explained next with respect to FIG. 3A-3C, which represent three typical scenarios.

Figure 3A:
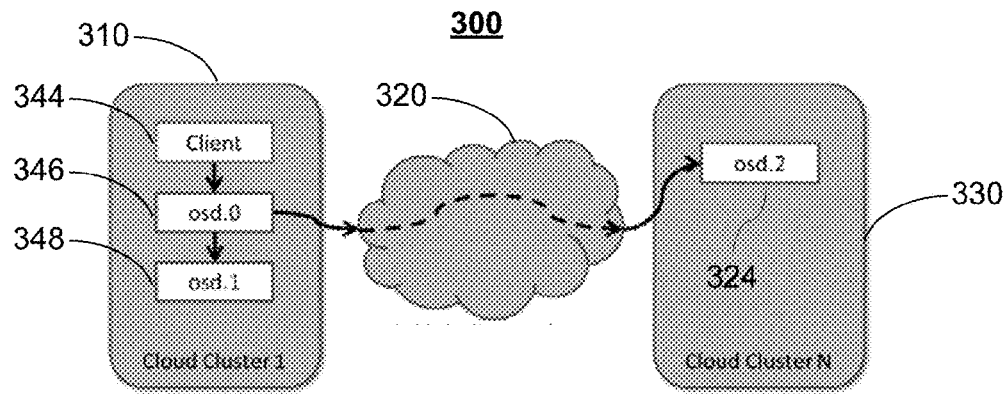
FIG. 3A demonstrates replication using Object Storage Devices (OSDs) located that are a long distance apart from each other across multiple clusters.

FIG. 3A demonstrates replication using Object Storage Devices (OSDs) located that are a long distance apart from each other across multiple clusters. Assuming osd.0 346 in in network 300 is the primary OSD that client 344 writes data into, and osd.1 348 & osd.2 324 are used to store replica. Then writing on osd.1 348 causes no latency as that OSD 348 is located in the same cluster 310 as client 344 and primary OSD 346. In contrast, osd.2 324 is likely to dominate the writing latency due to a number of hops that must occur across multiple clusters 320 and/or geographical distances.

Figure 3B:
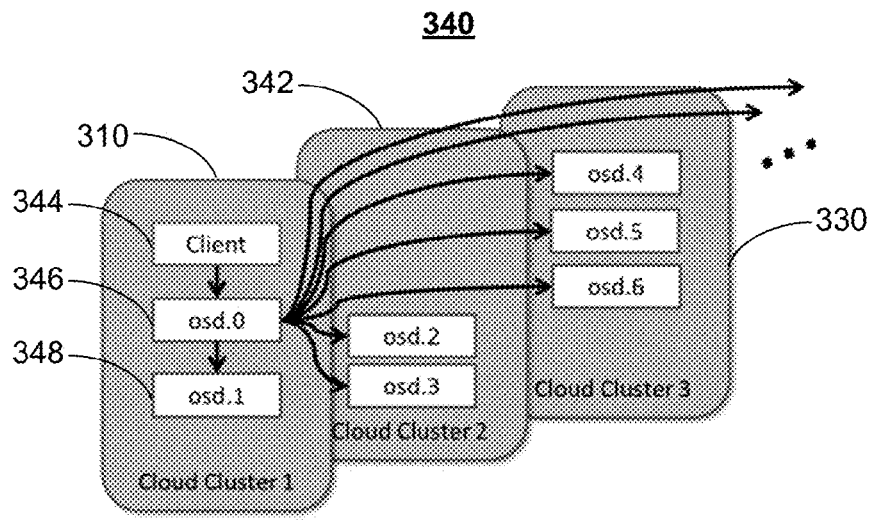
FIG. 3B demonstrates replication across a large number of OSDs.
Figure 3C:
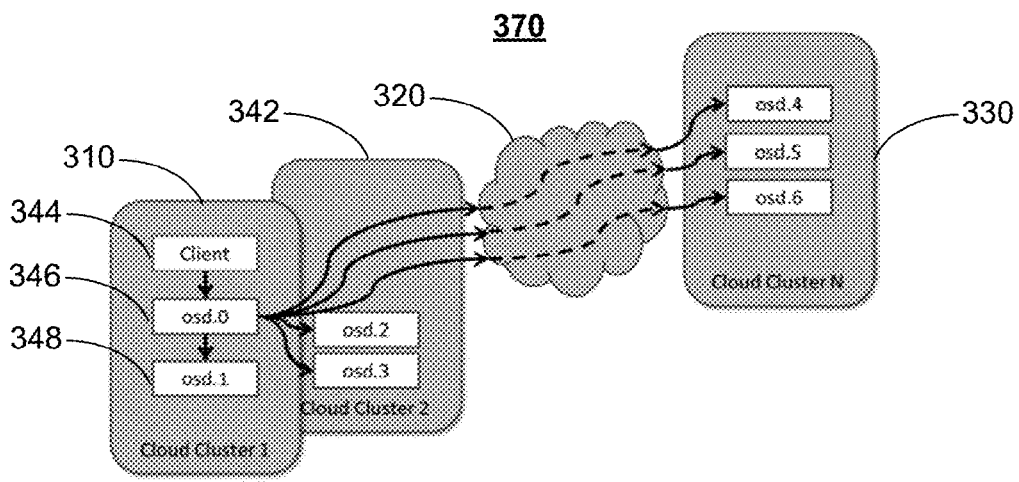
FIG. 3C illustrates a combination of the scenarios depicted in FIG. 3A and 3B.

FIG. 3B demonstrates replication across a large number of OSDs. According to Ceph, a primary OSD will not send and acknowledgement signal to the application before the primary OSD receives all outstanding the acknowledgements. Therefore, primary OSD (osd.0) 346 in network 340 has to successfully write copies to all of the replica prior to returning an ACK signal to client 344. As a result, the slowest speed to write replica determines the overall writing speed. Although it would be possible to open multiple concurrent connections to write objects simultaneously, connections to one or more OSDs will likely be limited by bandwidth constraints if many replica are required, thereby, dominating writing latency. FIG. 3C illustrates a combination of the scenarios depicted in FIG. 3A and 3B. For clarity, components similar to those shown in FIG. 3A and 3B are labeled in the same manner. For purposes of brevity, a description or their function is not repeated here. The writing latency in network 370 is affected by both the number of replica and the number of hops across clusters 342, 320 or geographical locations.

Overall, limitations caused by writing latency affect QoS of web services, application services, and database services. Therefore, it would be desirable to have systems and methods in place that reduce writing latency with object storage clients for use in large-scale distributed datacenters.

Figure 4:
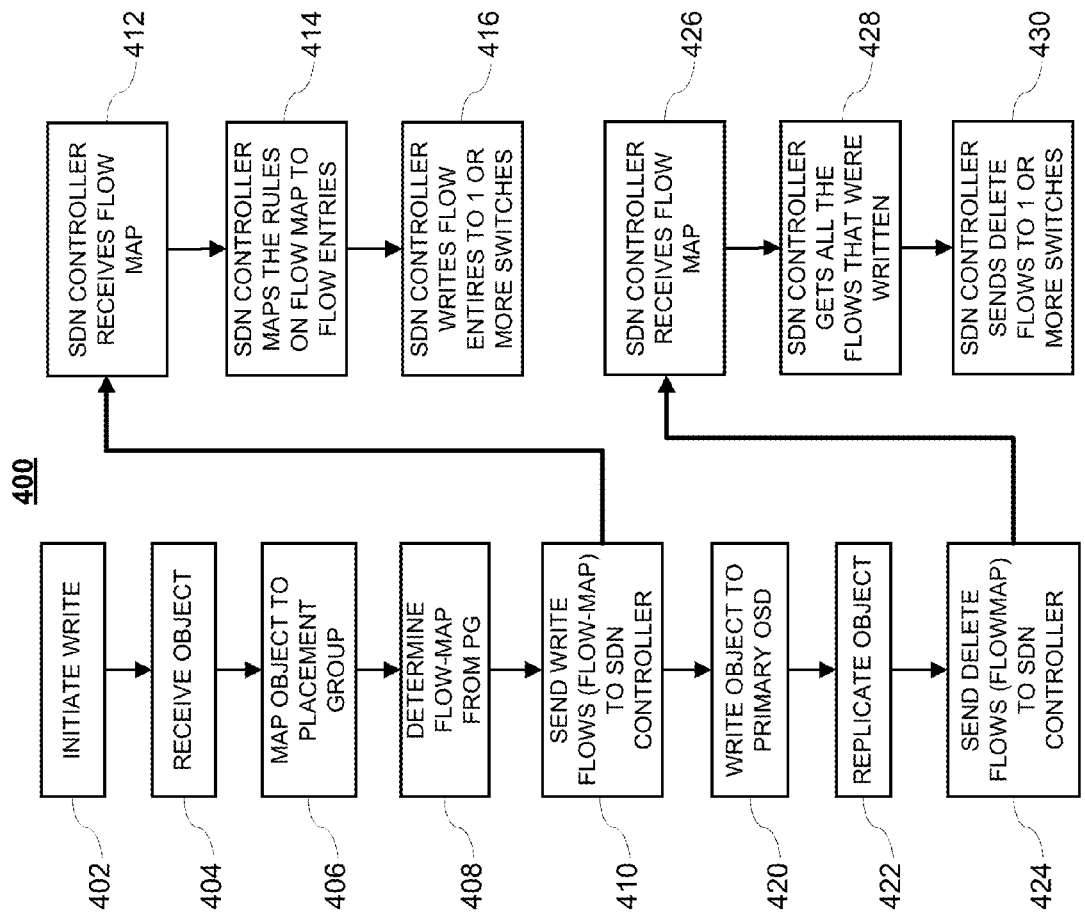
FIG. 4 illustrates a process for integrating SDN with an object storage client to enable acceleration of SDS, according to various embodiments of the invention.

FIG. 4 illustrates a process for integrating SDN with an object storage client to enable acceleration of SDS, according to various embodiments of the invention. For purposes of illustration, the invention is presented in the context of a Ceph client implementation. However, the inventors envision that any object storage client may be used to benefit from the inventive elements described herein.

The process 400 for integrating SDN with an object storage client in a cluster to enable acceleration of SDS begins at step 402 when an object storage client such as a Ceph client initiates a writing procedure, e.g., by calling a writing function.

At step 404, Ceph receives an object and employs, at step 406, a mapping process, for example via a CRUSH algorithm, to map the object to a group of objects, such as a PG.

At step 408, Ceph determines a flow map based on the PG. The flow map provides information about where a particular object is going to be written and identifies what the flow is going to look like.

Upon determining the flow map, the object storage client, at step 410, sends the OSD-related information, including the flow map comprising the PG, to an SDN controller. In embodiments, the SDN controller is located in a SDN server switch and is configured to insert rules, for example, into an ASIC card so as to control or modify a flow pattern in a network.

At step 412, the SDN controller receives the OSD-related information and, at step 414, generates flow entries therefrom that can be used to control the network. The generation of flow entries may include the generation of QoS policies associated with real-time flow-information. In embodiments, QoS policies are used to protect traffic in a particular network path from congestion. This may be accomplished by configuring the network such that the SDN controller assigns a higher priority (i.e., more bandwidth) to the to-be-protected traffic than to storage traffic. This clears traffic in the path from obstruction and, thus, in a deterministic manner, shortens the response time (e.g., by reducing latency of Ceph on a per-write basis) at the price of increasing storage response time. In short, for each write, the flow within the network can be predicted and communicated to the SDN controller to control the network appropriately.

In embodiments, the flow map comprises one or more rules (e.g., Access Control List (ACL) rules), which may be mapped to the flow entries, for example, by inserting the rules into a switching card (e.g., a network interface controller card). An initial rule may be used to establish a connection between the object storage client and a primary OSD when configuring the network. Subsequent rules may be used to establish a connection between the primary OSD and subsequent OSDs (secondary, tertiary, etc.), thus, prioritizing the connections between client and OSDs. The rules maybe based on a source destination IP address, a destination IP address, a port number, an ingress switch port, a VLAN, a VxLAN, etc.

At step 416, the flow entries are written on one or more network switches.

In embodiments, steps 402 through 416 occur prior to step 420, at which the object is written into a primary OSD, e.g., by the object storage client.

At step 422, the object is replicated, e.g., by the primary OSD writing it into subsequent OSDs. OSDs may be installed, for example, in one or more disks, partitions, or virtual machines on a servers.

At step 424, once writing operation is completed, the delete flows may be sent, e.g., from the object storage client to the SDN controller, such that the SDN controller may dynamically remove the flow-prioritizing configuration from the network.

In embodiments, the SDN controller, at step 426 receives the flow map and determines, at step 428, the written flows and sends, at step 420, delete flows to one or more switches.

Figures 5A, 5B:
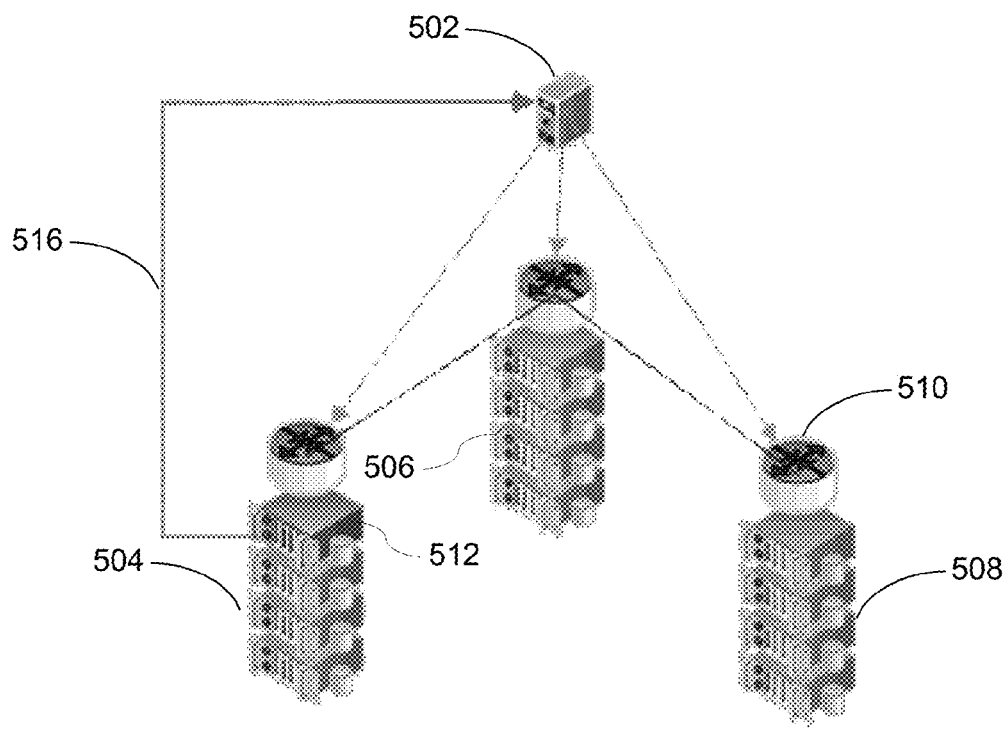
FIG. 5A illustrates an exemplary flow map according to various embodiments of the invention.
FIG. 5B illustrates an exemplary implementation of an SDN-optimized object storage system in a storage network, according to various embodiments of the invention.

An exemplary flow map according to various embodiments of the invention is presented in FIG. 5A. FIG. 5B illustrates an exemplary implementation of an SDN-optimized object storage system in a storage network, according to various embodiments of the invention. Storage network 550 comprises SDN controller 502, cluster 504-508. Each cluster further comprises SDN server switch 510 and one or more object storage client controllers 512, such as a Ceph controller. Storage network 550 may be implemented as a server-switch architecture.

In embodiments, object storage client controller 512 is integrated with an SDN plugin (not shown). SDN controller 502 is logically connected to all clusters 504-508, which may be implemented with a central operating system that operates as a controller and relatively simple agents that are configured to manipulate flow entries within each cluster 504-508.

In operation, SDN controller 502 controls storage network 550, for example, by programming flow entries from a central location. In embodiments, programming is accomplished by SDN controller 502 receiving OSD-related information associated with a flow map from object storage client controller 512 via the integrated SDN plugin, generating flow entries regarding how to process packets to program storage network 550, and applying flow rules to SDN server switch 510 using an object storage client (e.g., a Ceph client) to enable a desired flow of traffic within storage network 550.

Obtaining OSD-related information about what is about to enter storage network 550 early on, prior to performing a write function, allows SDN controller 502 to anticipate what flows will look like and take advantage of knowing, based on specific applications, such as Ceph, that certain traffic is going to appear on network 550. In other words, SDN controller 502 does not have to wait for traffic to flow to know what to do with it. Instead, controller 502 will have sufficient time to react and calculate behavior to appropriately control the flow in a manner such that certain traffic is protected prior to packets entering storage network 550 and prior to the actual write being performed.

In embodiments, once the object storage client initiates a writing procedure and determines the flow map based on a group of objects, for example, by mapping objects into PGs, SDN controller 502 generates QoS policies associated with real-time flow-information for server switch 510 such that server switch 510 can prioritize any particular connection within storage network 550. The QoS policies may be used to map or modify rules based on a source destination IP address, a destination IP address, a port number, an ingress switch port, a VLAN, a VxLAN, etc., from the flow map to the flow entries.

For comparison purposes, existing SDN controllers that use, e.g., OpenFlow, that peer into traffic after the package enters the network in order to determine the type of content of the traffic (e.g., Ceph traffic, web request, etc.) take action to protect that traffic when it may be already too late. For example, in a 10 GB speeds, by the time the SDN controller determines the QoS etc., the packets will be already been injected into the network and the writes will have been already performed.

Figure 6A:
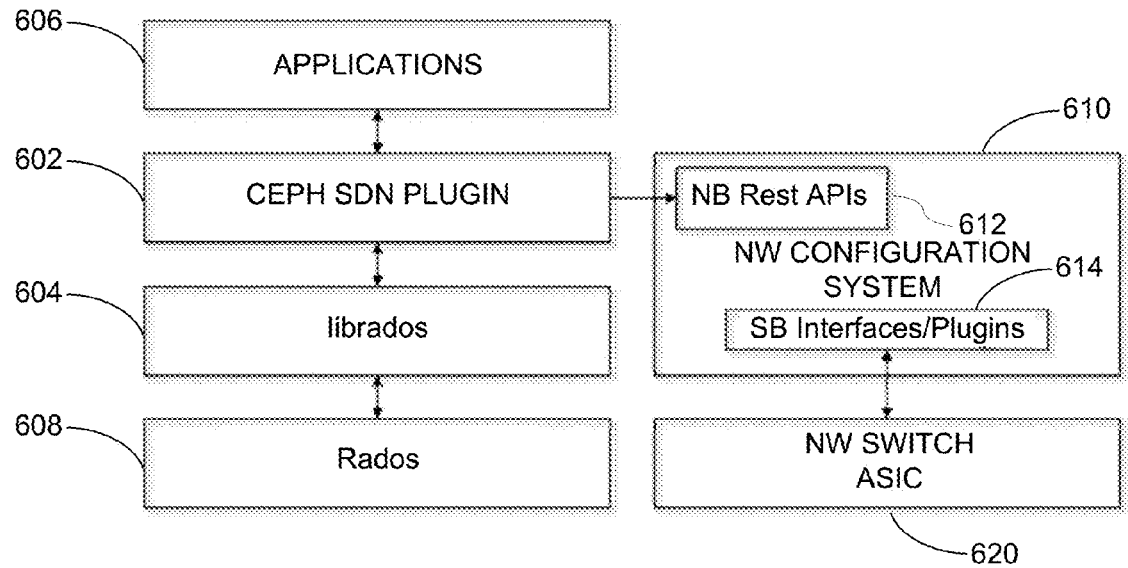
FIG. 6A illustrates an SDN-optimized object storage system according to various embodiments of the invention.

FIG. 6A illustrates an SDN-optimized object storage system according to various embodiments of the invention. System 600 comprises Ceph SDN plugin 602 that is built on top of librados 604. In embodiments, Ceph SDN plugin 602 communicates with upper-layer applications 606 and uses APIs received from librados 604 to collect OSD information and for pass through writing requests. Ceph SDN plugin 602 communicates with network configuration system (e.g., an SDN controller) 610 via ODL's northbound (NB) Rest APIs 612. Once network configuration system 610, which may operate on an SDN server switch (not shown), receives Restful information from Ceph SDN plugin 602, network configuration system 610 interprets that information and notifies southbound (SB) interfaces or plugins 614 to translate to arguments, for example, using network switch ASIC 620 and execute operations, such as inserting ACL rules or modifying flows.

In embodiments, in response to taking an object name from applications, a Ceph SDN function calls mapping functions (e.g., PG hashing or a CRUSH algorithm) to calculate OSD IDs, and looks up a cluster map in order to retrieve detailed OSD information, such as IP addresses, historic writing latency data, etc.

In embodiments, look-up or mapping is used to reduce northbound to southbound process times within network configuration system 610 or translation time from NB Restful information 612 to SB network switch ASIC 620 usable arguments or values. In embodiments, in response to APIs being called by network configuration system 610, network switch ASIC 620 may perform a number of operations, including inserting ACL rules or modifies flows.

In embodiments, the use of SDN optimization is based on a measurement of latency and a decision function to ensure that an expected writing performance is achieved. A decision to not employ SDN optimization in certain circumstances avoids, for example, that the additional latency introduced by Ceph SDN optimization is comparable or significantly larger than, i.e., outweighs the benefits of, directly writing with Ceph.

Figure 6B:
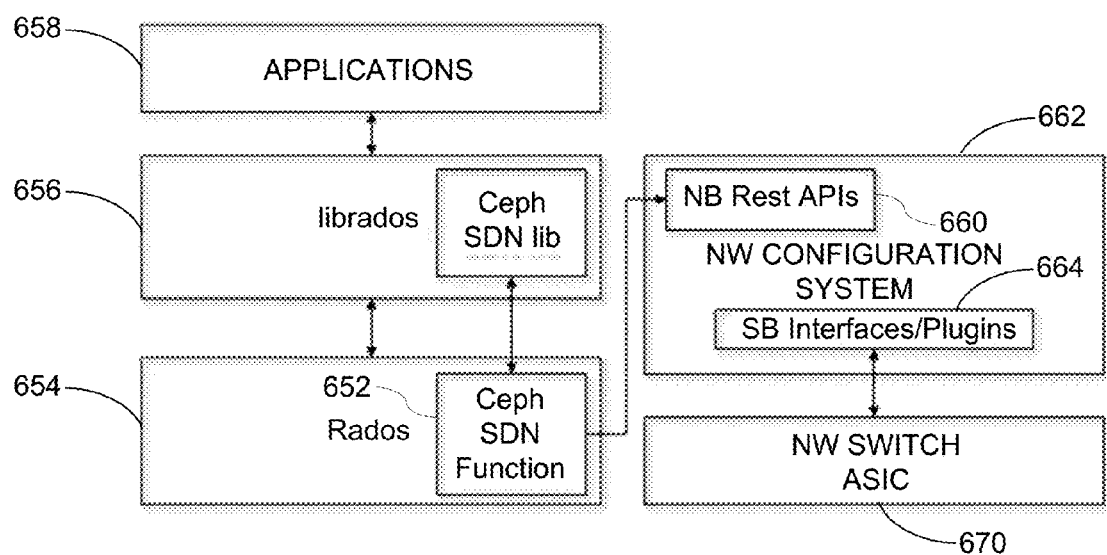
FIG. 6B illustrates another SDN-optimized object storage system according to various embodiments of the invention.

FIG. 6B illustrates another implementation of an integrated object storage client with SDN, according to various embodiments of the invention. Same numerals as in FIG. 6A denote similar elements. In a manner similar to FIG. 6B, Ceph SDN function 652 communicates with NB APIs of ODL 660. In embodiments, Ceph SDN function 652 is implemented as a part of Rados 654 and provides a library as a part of librados 656. In these embodiments, a resulting advantage is that upper-layer applications 658 can directly utilize Ceph SDN APIs.

One skilled in the art will appreciate that numerous other designs using different or additional modules and configurations may be implemented to achieve the integration of the object storage client with SDN in accordance with the objectives of the invention. One skilled in the art will further appreciate that the SDN plugins need not be dependent on a Ceph implementation and, where information about an impending flow is known, the SDN plugins may be applied to any storage or application prior to a packet flow traveling through a network.

Figure 7:
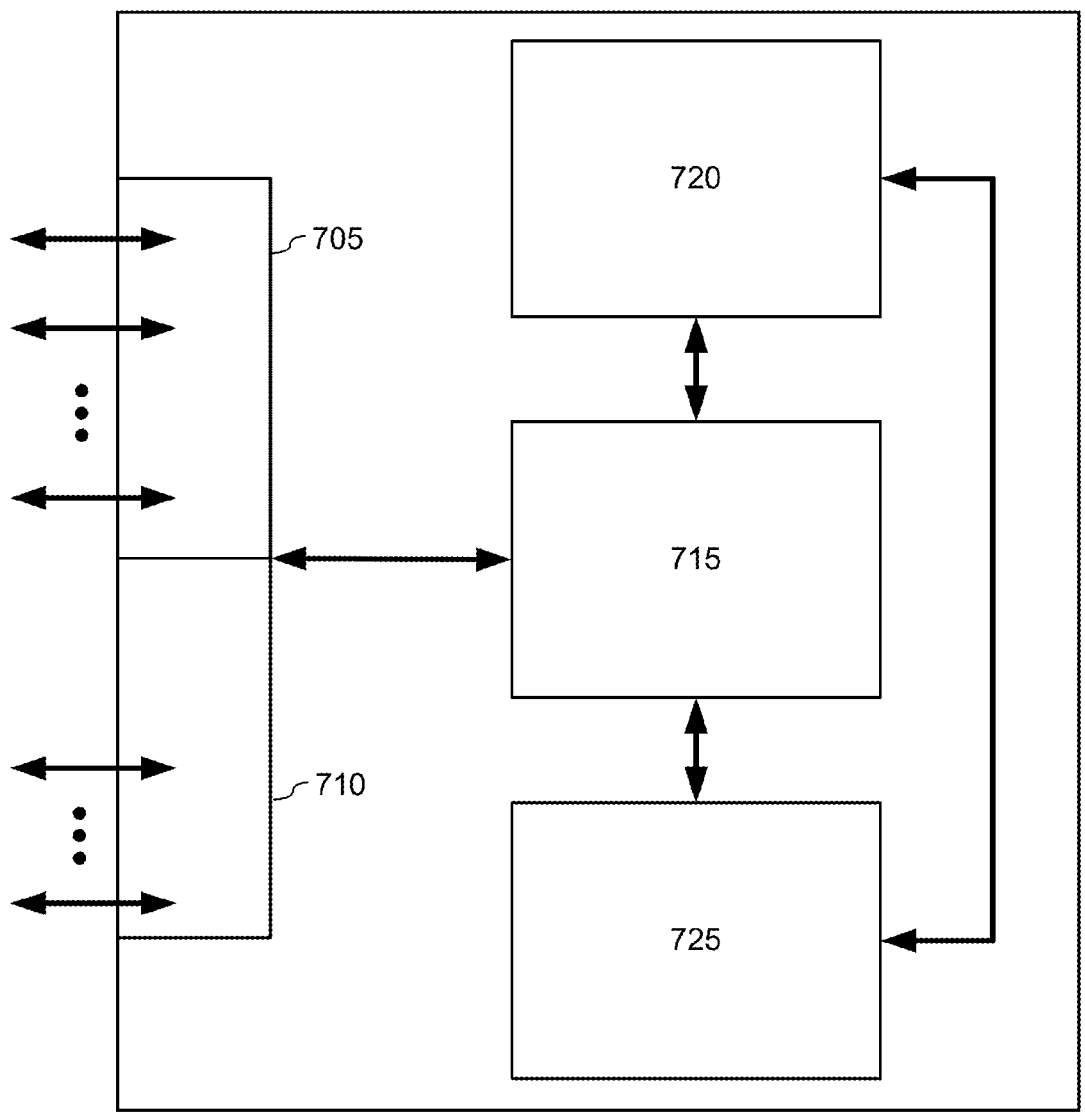
FIG. 7 depicts a simplified block diagram of a system for enabling acceleration of SDS by integrating SDN with an object storage client in accordance with various embodiments of the invention.

FIG. 7 depicts a simplified block diagram of a system for enabling acceleration of SDS by integrating SDN with an object storage client in accordance with various embodiments of the invention. It is understood that the functionalities shown for device 700 support various embodiments of the SDS acceleration system and that the system may be differently configured within a cluster and include different components. System 700 may include a plurality of I/O ports 705, bus 710, network processing unit (NPU) 715, one or more tables 720, and CPU 725. The system includes a power supply (not shown) and may also include other components, which are not shown for sake of simplicity.

In one embodiment, I/O ports 705 are connected via one or more cables to one or more other network devices or clients. Network processing unit 715 may use information included in the network data received at node 700, as well as information stored in table 720, to identify nodes for the network data, among other possible activities. In one embodiment, a switching fabric then schedules the network data for propagation through a node to an egress port for transmission to another node.

It is noted that aspects of the present invention may be encoded on one or more non-transitory computer-readable media with instructions for one or more processors to cause steps to be performed. It is also noted that the non-transitory computer-readable media may include volatile and non-volatile memory. It is noted that alternative implementations are possible, including hardware and software/hardware implementations. Hardware-implemented functions may be realized using ASICs, programmable arrays, digital signal processing circuitry, and the like. Accordingly, the "means" terms in any claims are intended to cover both software and hardware implementations. Similarly, the term "computer-readable medium or media" as used herein includes software and/or hardware having a program of instructions embodied therein, or a combination thereof. With these implementation alternatives in mind, it is understood that the figures and accompanying description provide the functional information one skilled in the art would require to write program code (i.e., software) and/or to fabricate circuits (i.e., hardware) to perform the processing required.

One skilled in the art will recognize that no particular protocol or programming language is critical to the practice of the present invention. One skilled in the art will also recognize that a number of the elements described above may be physically and/or functionally separated into sub-modules or combined together. It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method to integrate Software-Defined Networking (SDN) with an object storage client to enable object-writes in an object storage cluster, the method comprising:
responsive to receiving a write request from a client, determining a flow map comprising a group of objects selected to store data associated with the write request;
sending Object Storage Device (OSD)-related information that is associated with or comprises the flow map to an SDN controller; and
generating flow entries, using the SDN controller, to control traffic in a network, the SDN controller generating the flow entries, comprising one or more prioritizations for one or more flows that result, at least in part, by executing the write request, using at least the flow map and one or more predictions of traffic in the network that result, at least in part, by executing the write request.

2. The method according to claim 1, further comprising, in response to receiving an object from an object storage client, mapping the object to the group of objects.

3. The method according to claim 1, wherein at least one of the one or more prioritizations of the flow entries comprises one or more Quality of Service (QoS) policies associated with real-time flow-information.

4. The method according to claim 1, wherein generating flow entries comprises mapping the one or more rules from the flow map to the flow entries.

5. The method according to claim 1, wherein at least one of the one or more prioritizations of the flow entries comprises prioritizing a connection between at least one of a first group comprising a client and a primary OSD and a second group comprising the primary OSD and a secondary OSD.

6. The method according to claim 1, further comprising (primary OSD) replicating the object by writing the object into the secondary OSD.

7. The method according to claim 1, further comprising in response to receiving written flows the SDN controller sending delete flows to one or more switches.

8. The method according to claim 1, wherein the OSD-related information comprises write flows.

9. The method according to claim 1, wherein the flow map identifies a primary OSD and comprises one or more rules.

10. A system to enable dynamic configuration of a network, the system comprising:
an object storage client, operating on a computing system comprising one or more processors and communicatively coupled to receive Object Storage Device (OSD)-related information about distributed storage in a network, the object storage client configured to:
determine a flow map based on groups of objects in the distributed storage that are intended to receive data related to a data request; and
send Object Storage Device (OSD)-related information associated with or comprising the flow map to an SDN controller that generates flow entries, comprising one or more prioritizations for one or more flows that result at least in part by executing the data request using at least the flow map and one or more predictions of traffic in the network that result, at least in part, by executing the data request, to control the network, at least in part, using the flow entries.

11. The system according to claim 10, wherein the object storage client is a Ceph client.

12. The system according to claim 10, wherein the groups of objects are located in placement groups.

13. The system according to claim 10, further comprising a primary OSD to replicate itself by writing the groups of objects into a secondary OSD.

14. The system according to claim 10, wherein the object storage client is configured to send at least one of a delete flow map and a flow map comprising written flows to the SDN controller.

15. A system to enable integration of distributed storage with Software-Defined Networking (SDN), the system comprising:
an object storage client operating on a computing system comprising one or more processors and communicatively coupled to receive information about distributed storage in a network and configured to determine a flow map based on a group of objects in the distributed storage and a data request; and
an SDN controller, operating on a server system comprising one or more processors and communicatively coupled to at least one network interfacing device to control network traffic, configured to:
receive the flow map; and
using at least the flow map and one or more predictions of traffic in the network that result, at least in part, by executing the data request, generate flow entries, comprising one or more prioritizations for one or more data flows that result, at least in part, by executing the data request, to control traffic in the network using the flow entries.

16. The system according to claim 15, wherein the SDN controller is located in a server-switch architecture.

17. The system according to claim 15, wherein the SDN controller is configured to generate Quality of Service (QoS) policies associated with real-time flow-information to prioritize one or more connections.

18. The system according to claim 17, wherein generating the QoS policies comprises mapping one or more rules from the flow map to the flow entries.

19. The system according to claim 18, wherein the one or more rules are based on one of a source destination IP address, a destination IP address, a port number, an ingress switch port, a VLAN, and a VxLAN.

20. The system according to claim 18, wherein mapping the one or more rules comprises inserting Access Control List (ACL) rules into a network interface controller card, the ACL rules being associated with a connection between at least one of a first group comprising a client and a primary OSD and a second group comprising the primary OSD and a secondary OSD.

* * * * *